United States Patent
Lee

(10) Patent No.: US 11,122,106 B2
(45) Date of Patent: Sep. 14, 2021

(54) METHOD AND APPARATUS FOR PROVIDING WEB SERVICE USING EDGE COMPUTING SERVICE

(71) Applicant: SAMSUNG ELECTRONICS CO., LTD., Suwon-si (KR)

(72) Inventor: Jaekeun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/090,004

(22) Filed: Nov. 5, 2020

(65) Prior Publication Data
US 2021/0144192 A1    May 13, 2021

(30) Foreign Application Priority Data
Nov. 8, 2019  (KR) .................... 10-2019-0142997

(51) Int. Cl.
| | |
|---|---|
| *H04L 29/08* | (2006.01) |
| *G06F 16/957* | (2019.01) |
| *G06F 16/958* | (2019.01) |
| *G06F 16/955* | (2019.01) |

(52) U.S. Cl.
CPC .......... *H04L 67/02* (2013.01); *G06F 16/9566* (2019.01); *G06F 16/9574* (2019.01); *G06F 16/986* (2019.01); *H04L 67/2842* (2013.01)

(58) Field of Classification Search
CPC ............................ H04L 67/02–67/1002; H04L 67/2842–67/2852; G06F 16/9566–16/986
See application file for complete search history.

(56) References Cited

U.S. PATENT DOCUMENTS

| | | | |
|---|---|---|---|
| 10,015,695 B2 | 7/2018 | Mathew | |
| 10,230,812 B1* | 3/2019 | Ram | ................... H04L 67/2823 |
| 2006/0218304 A1* | 9/2006 | Mukherjee | .......... G06F 16/9574 |
| | | | 709/246 |

(Continued)

FOREIGN PATENT DOCUMENTS

WO   2018/137149   8/2018

OTHER PUBLICATIONS

[Online], "2013 Content Networking Trends—OTT, Global CDN and Operator CDN", NetManias, Sep. 4, 2013, printed: Nov. 5, 2020, 2 pages.

(Continued)

*Primary Examiner* — Clayton R Williams
(74) *Attorney, Agent, or Firm* — Nixon & Vanderhye, P.C.

(57) ABSTRACT

An example method, performed by an edge data network, of providing a web service to a terminal includes: receiving, from the terminal, a request for access to a web page; identifying uniform resource locators (URLs) of a plurality of pieces of content for displaying the web page, the URLs being included in a hypertext markup language (HTML) of the web page; identifying first content cached by the edge data network from among the plurality of pieces of content for displaying the web page; changing a URL of the first content among the URLs of the plurality of pieces of content to a URL representing a location at which the first content is cached to modulate the HTML; and transmitting the modulated HTML including the changed URL of the first content to the terminal.

18 Claims, 12 Drawing Sheets

(56) References Cited

U.S. PATENT DOCUMENTS

2009/0070533 A1\* 3/2009 Elazary .................. G06F 12/12
711/133
2010/0125626 A1\* 5/2010 Lucas ................. H04L 67/1008
709/203
2018/0288829 A1 10/2018 Palle et al.

OTHER PUBLICATIONS

[Online], "Akamai Platform Architecture", NetManias, Jan. 13, 2013, printed: Nov. 5, 2020, 2 pages.
[Online], "Answer Google DNS & Akamai CDN", NetManias, Dec. 15, 2011, printed: Nov. 5, 2020, with Eng. Translation, 10 pages.
[Online], "Comparison of MEC (Mobile Edge Computing) Implementation—4G and 5G", NetManias, Nov. 7, 2018, printed: Nov. 5, 2020, with Eng. Translation, 4 pages.
[Online], "DNS Basic Operation", NetManias, Dec. 12, 2011, printed: Nov. 5, 2020, with Eng. Translation, 7 pages.

\* cited by examiner

METHOD AND APPARATUS FOR PROVIDING WEB SERVICE USING EDGE COMPUTING SERVICE

CROSS-REFERENCE TO RELATED APPLICATION

This application is based on and claims priority under 35 U.S.C. § 119 to Korean Patent Application No. 10-2019-0142997, filed on Nov. 8, 2019, in the Korean Intellectual Property Office, the disclosure of which is incorporated by reference herein in its entirety.

BACKGROUND

1. Field

The disclosure relates to a method and apparatus for providing an edge computing service (for example, a multi-access edge computing (MEC) service).

2. Description of Related Art

Recently, edge computing technology for transmitting data by using an edge server is being discussed. Edge computing technology includes, for example, multi-access edge computing (MEC) or fog computing (FOC). Edge computing technology may refer, for example, to technology for transmitting data to an electronic device through a server (hereinafter, referred to as an 'edge data network' or 'MEC' server) installed at a location geographically close to the electronic device, for example, inside or around a base station. For example, an application requiring low latency among at least one application installed in an electronic device transmits and receives data through an edge server installed at a location geographically close to the electronic device, not through a server located on an external data network (DN) (for example, the Internet).

Recently, services (hereinafter, referred to as 'MEC-based services' or 'MEC services') using edge computing technology are being discussed, and electronic devices supporting MEC-based services are being studied and developed. For example, applications of electronic devices transmit and receive edge computing-based data on an edge server (or an application of the edge server) and an application layer.

As studies and development for supporting MEC-based services are conducted, a method for reducing the latency of the edge data network (for example, a MEC server) providing the MEC-based services is being discussed. For example, a method for effectively processing traffic in providing a web service by using an edge computing service is being discussed.

SUMMARY

Embodiments of the disclosure provide a method and apparatus for providing a web service by using an edge computing service.

Additional aspects will be set forth in part in the description which follows and, in part, will be apparent from the description.

According to an example embodiment of the disclosure, a method, performed by an edge data network, of providing a web service to a terminal includes: receiving a request for access to a web page from the terminal; identifying uniform resource locators (URLs) of a plurality of pieces of content for displaying the web page, the URLs included in a hypertext markup language (HTML) of the web page; identifying first content cached by the edge data network from among the plurality of pieces of content for displaying the web page; modulating the HTML by changing a URL of the first content among the URLs of the plurality of pieces of content to a URL representing a location at which the first content is cached; and transmitting the modulated HTML including the changed URL of the first content to the terminal.

According to an embodiment of the disclosure, an edge data network of providing a web service to a terminal includes: a communicator; a memory storing a plurality of instructions; and a processor configured to execute the plurality of instructions to receive a request for access to a web page from the terminal, identify uniform resource locators (URLs) of a plurality of pieces of content for displaying the web page, the URLs included in a hypertext markup language (HTML) of the web page, identify first content cached by the edge data network from among the plurality of pieces of content for displaying the web page, modulate the HTML by changing a URL of the first content among the URLs of the plurality of pieces of content to a URL representing a location at which the first content is cached, and transmit the modulated HTML including the changed URL of the first content to the terminal.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
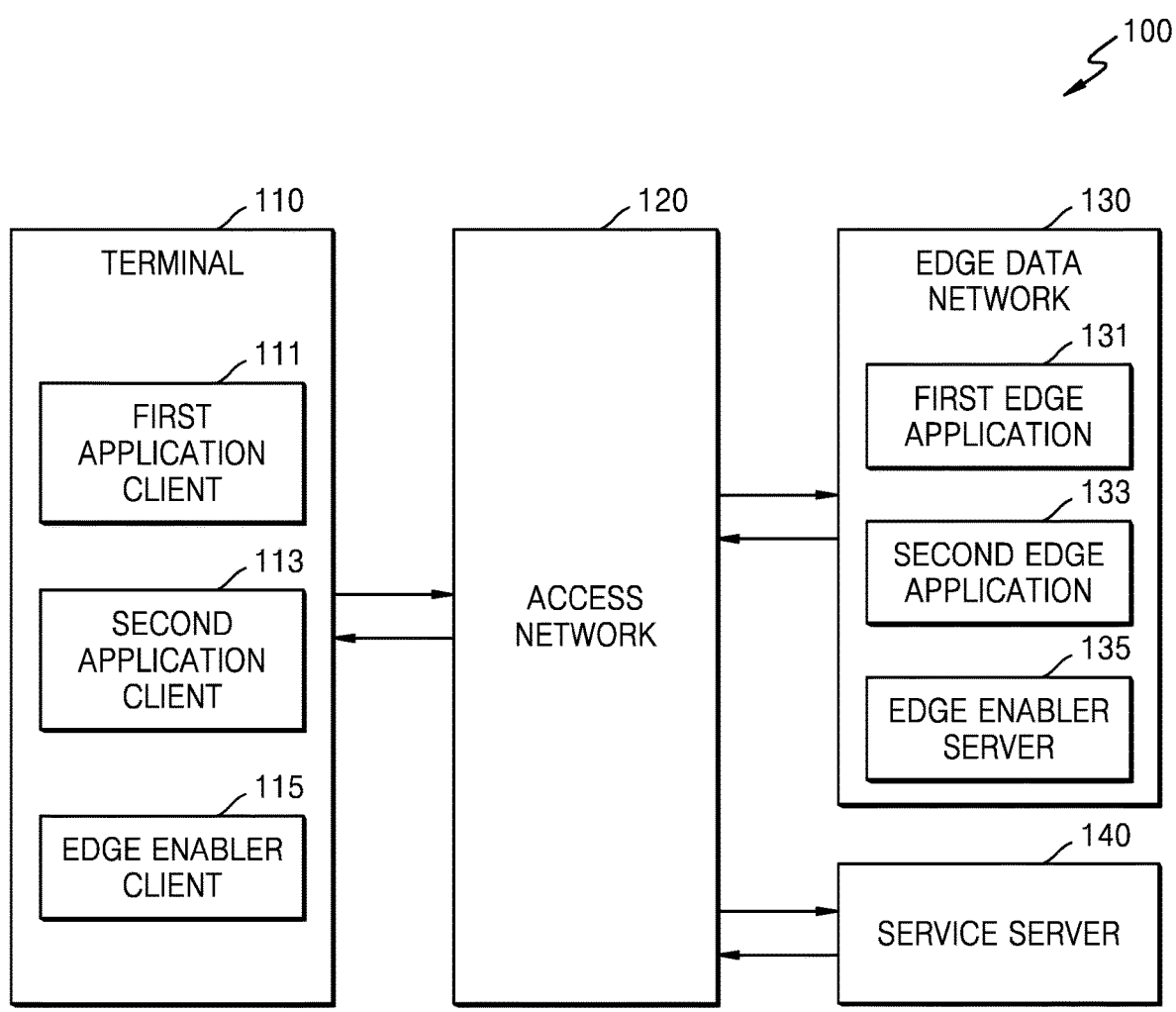
FIG. 1 is a block diagram illustrating an example multi-access edge computing (MEC) technology in a network environment, according to various embodiments.

Hereinafter, various example embodiments of the disclosure will be described in greater detail with reference to the accompanying drawings.

When the embodiments of the disclosure are described, descriptions about technical content well known in the technical field to which the disclosure belongs and not directly related to the disclosure may be omitted to more clearly convey, without obscuring, the gist of the disclosure by omitting unnecessary descriptions.

Some components of the accompanying drawings may be exaggeratedly shown, omitted, or schematically shown. The sizes of the components may not completely reflect their actual sizes. The same or corresponding components in the drawings are assigned like reference numerals.

Advantages and features of the disclosure and a method for achieving them will be clear with reference to the accompanying drawings, in which various example embodiments of the disclosure are illustrated. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to those of ordinary skill in the art, and the disclosure is only defined by the scope of the claims. Like reference numerals denote like elements throughout the disclosure.

Throughout the disclosure, the expression "at least one of a, b or c" indicates only a, only b, only c, both a and b, both a and c, both b and c, all of a, b, and c, or variations thereof.

Examples of a terminal may include, for example, and without limitation, a user equipment (UE), a mobile station (MS), a cellular phone, a smartphone, a computer, a multimedia system capable of performing a communication function, or the like.

In the disclosure, a controller may also be referred to as a processor.

Throughout the disclosure, a layer (or a layer apparatus) may also be referred to as an entity.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur in a different order. For example, two blocks shown in succession may actually be executed substantially concurrently, or the blocks may sometimes be performed in reverse order according to the corresponding function.

As used herein, the terms 'portion', 'module', or 'unit' may refer, for example, to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to embodiments of the disclosure, 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or subdivided into additional components and 'portions', 'modules' or 'units'. Also, the components and 'portions', 'modules' or 'units' may be configured to run on one or more Central Processing Units (CPUs) in a device or a security multimedia card. Also, in the embodiments of the disclosure, 'portion', 'module' or 'unit' may include one or more processors.

FIG. 1 is a block diagram illustrating example multi-access edge computing (MEC) technology in a network environment according to various embodiments.

Referring to FIG. 1, a network environment 100 may include a terminal 110, an access network (AN) 120, an edge data network 130, and a service server 140. That is, the network environment 100 according to carious embodiments may be an environment configured with a plurality of elements for supporting MEC-based services. However, the network environment 100 is not limited to the components or configuration illustrated in FIG. 1.

According to various embodiments of the disclosure, each of components included in the network environment 100 may be a physical entity unit, or may be software or a module unit capable of performing an independent function.

According to various embodiments, the terminal 110 may be a device that is used by a user. For example, the terminal 110 may, for example and without limitation, be a user equipment (UE), a mobile station, a subscriber station, a remote terminal, a wireless terminal, or a user device. Referring to FIG. 1, the terminal 110 may include a first application client (or an application client) 111, a second application client 113, and an edge enabler client (or a MEC enabling layer (MEL)) 115. To use a MEC service, the terminal 110 may perform a required task by using the edge enabler client 115.

Although not shown in FIG. 1, the terminal 110 may include a multi-access service agent (MSA) and a multi-access service enabler (MSE), according to various embodiments. According to various embodiments of the disclosure, the MSA may receive information related to authentication, authorization, and a policy (for example, an app routing policy, a discovery policy, or a monitoring policy) of the terminal 110. The MSE may set a route according to a policy, and manage MEC-based data transmission. According to various embodiments, the edge enabler client 115 may be a component that performs a task required for using a MEC service among services of the MSE.

According to various embodiments, the terminal 110 may execute a plurality of applications. For example, the terminal 110 may execute the first application client 111 and the second application client 113. The plurality of applications may require different network services based on at least one of required data rates, latency (or delay speed), reliabilities, the number of electronic devices having access to a network, a network access period of the terminal 110, or average data usage. The different network services may include, for example, enhanced mobile broadband (eMBB), ultra-reliable and low latency communication (URLLC), or massive machine type communication (mMTC).

An application client of the terminal 110 may be a basic application installed in advance in the terminal 110 or an application provided by a third party. That is, the application client may be a client application program running on the terminal 110 to provide a specific application service. For example, a web browser for providing a web page may be a kind of application client that runs on the terminal 110. A plurality of application clients may run on the terminal 110. At least one of the application clients may use a service provided from the edge data network 130. For example, the application client may be an application installed and executed in the terminal 110, and provide a function of transmitting and receiving data through the edge data network 130. The application client of the terminal 110 may be application software being executed on the terminal 110 to use a function provided by one or more specific edge applications.

According to various embodiments, the first and second application clients 111 and 113 of the terminal 110 may perform data transmission to the service server 140 or edge computing-based data transmission to the edge data network 130, based on a required network service type. For example, when the first application client 111 does not require low latency, the first application client 111 may perform data transmission to the service server 140. As another example, when the second application client 113 requires low latency, the second application client 113 may perform MEC-based data transmission to the edge data network 130.

According to various embodiments of the disclosure, an application of the terminal 110 may be referred to as an application client, a client application (Client App), or an UE application (UE App). For convenience of description, hereinafter, in the disclosure, an application of the terminal 110 is referred to as an application client.

According to various embodiments, the access network 120 may provide a channel for wireless communication with the terminal 110. For example, the access network 120 may be a radio access network (RAN), a base station, eNodeB (eNB), a 5G node, a transmission/reception point (TRP), or a 5th generation NodeB (5GNB).

According to various embodiments, the edge data network 130 may be a server which the terminal 110 accesses to use a MEC service. The edge data network 130 may be installed at a location geographically close to an electronic device, for example, inside or around a base station. According to various embodiments of the disclosure, the edge data network 130 may transmit/receive data to/from the terminal 110 not via an external data network (DN) (for example, the Internet). According to various embodiments, the MEC may be referred to as multi-access edge computing or mobile-edge computing.

According to various embodiments, the edge data network 130 may be referred to as a MEC host, an edge computing server, a mobile edge host, an edge computing platform, a MEC server, etc. For convenience of description, hereinafter, in the disclosure, a MEC server is referred to as the edge data network 130. Referring to FIG. 1, the edge data network 130 may include a first edge application 131, a second edge application 133, and an edge enabler server (or MEP (MEC platform)) 135. The edge enabler server 135 may be a configuration for providing a MEC service or performing traffic control, etc. in the edge data network 130.

According to various embodiments of the disclosure, the edge data network 130 may execute a plurality of applications. For example, the edge data network 130 may execute the first edge application 131 and the second edge application 133. According to various embodiments, an edge application may be an application provided by a third party in an edge data network providing a MEC service. An edge application may be used to establish a data session with an application client to transmit/receive related data to/from the application client. That is, an edge application may establish a data session with an application client. According to various embodiments, a data session may be a communication path formed to enable an application client of the terminal 110 to transmit/receive data to/from an edge application of the edge data network 130.

According to various embodiments, an application of the edge data network 130 may be referred to as a MEC application (MEC App), ME (MEC) App, an edge application server, or an edge application. For convenience of description, hereinafter, in the disclosure, an application of the edge data network 130 is referred to as an edge application. However, an edge application may refer, for example, although referred to as an application, to an application server existing in an edge data network.

According to various embodiments, the service server 140 may provide content related to an application client of the terminal 110. For example, the service server 140 may provide the edge data network 130 with an edge application capable of providing a service or data required for the terminal 110 to drive (or execute) an application client and providing a MEC service to the application client of the terminal 110. The service server 140 may operate or be managed by a content provider that provides content to the terminal 110.

According to various embodiments, the service server 140 may transmit/receive data to/from the terminal 110 via an external data network (DN) (for example, the Internet). For example, the service server 140 may provide data (for example, a web page, content in a web page, etc.) related to a web service, and may be Google server, Naver server, etc. Hereinafter, the service server 140 providing data related to a web service is referred to as a web server.

Although not shown in FIG. 1, a core network CN and a data network DN may be provided between the access network 120 and the edge network 130. According to various embodiments, the data network DN may transmit/receive data (or data packets) to/from the terminal 110 through the core network CN and the access network 120 to thereby provide a service (for example, an Internet service and an IP multimedia subsystem (IMS) service). For example, the data network DN may be managed by a communication provider. According to various embodiments, the edge data network 130 may be connected to the access network 120 or the core network CN through a data network (for example, a local DN).

Figure 2A:
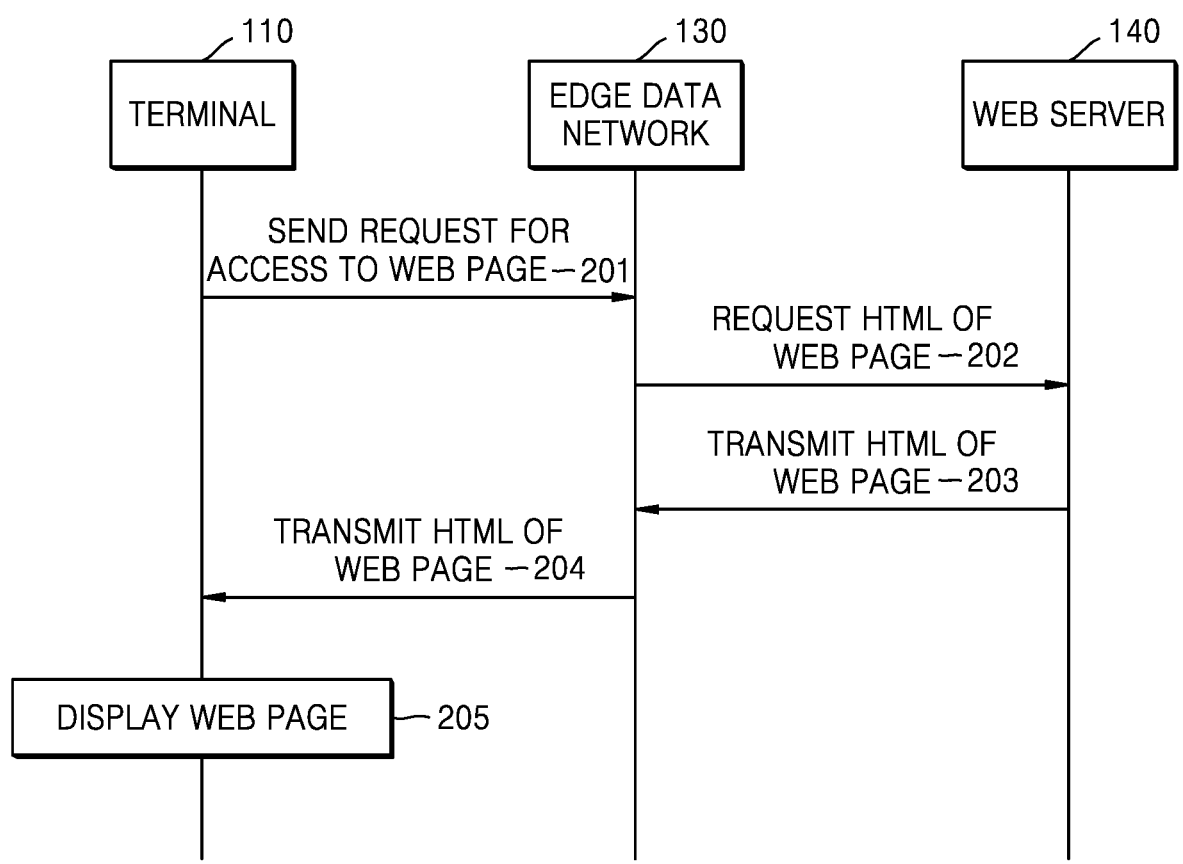
FIG. 2A is a signal flow diagram illustrating an example procedure for displaying a web page in a terminal according to various embodiments.

FIG. 2A is a signal flow diagram illustrating an example procedure for displaying a web page in a terminal according to various embodiments.

Referring to FIG. 2A, the terminal 110 may send a request for access to a web page to the edge data network 130, in operation 201. The request for the access to the web page may, for example, be a request for a hypertext markup language (HTML) of the web page from the terminal 110.

The request for the access to the web page from the terminal 110 may be performed by the following procedure. The terminal 110 may obtain a uniform resource locator (URL) of the web page by a user's input through a web browser. The web browser of the terminal 110 may be the first application client 111 of the terminal 110.

The terminal 110 may obtain an internet protocol (IP) address corresponding to a domain name (for example, a domain name for identifying a web server (host), that is, a domain name corresponding to an IP address of the web server) included in the URL of the web page from a local domain name system (DNS) server. The terminal 110 may send a request for access to the web page to the edge data network 130 by using the URL of the web page and the IP address.

In this case, in a DNS table (or a zone file) of a local DNS server of the terminal 110, an IP address corresponding to the domain name included in the URL of the web page may be mapped to an IP address of the edge data network 130. To provide a service for the web page to the terminal 110 with low latency, the DNS table may have been set in advance to cause the terminal 110 to send a request for access to the web page to the edge data network 130, instead of a web server providing the web page. Accordingly, the terminal 110 may receive the IP address of the edge data network 130 as an IP address corresponding to the domain name included in the URL of the web page from the local DNS server. The terminal 110 may send the request for access to the web page to the edge data network 130 by using the IP address of the edge data network 130.

In the DNS table, a plurality of domain names may be mapped to the IP address of the edge data network 130. Although URLs include different domain names, requests based on the different URLs may be transmitted to the edge data network 130 according to the DNS table. The access to the web page may be requested by using HTTP (Hypertext Transfer Protocol), and the request using HTTP may include various information for accessing the web page. The edge data network 130 may perform an operation for providing HTML (Hypertext Markup Language) for the web page by using the information included in the request for the access to the web page based on HTTP.

When the edge data network 130 receives the request for the access to the web page from the terminal 110, the edge data network 130 may process data for the terminal 110 to display the web page, or cache content required for the terminal 110 to display the web page, to provide a low-latency web page service to the terminal 110. Herein, caching may refer to technology of obtaining and storing data in advance from a server, etc. providing the data before receiving a request for the data. Through caching, requested data may be provided with low latency. The edge data network 130 may cache content from a web server 140 (a service server) and store the content in an internal storage space or in a cache server connected to the edge data network 130.

The edge data network 130 may request the web server 140 providing the web page requested by the terminal 110 to send the HTML of the web page, in operation 202, and the web server 140 may transmit the HTML of the web page to the edge data network 130, in operation 203. An operation of processing the request for the access to the web page from the terminal 110 may be performed by the first edge application 131 of the edge data network 130 providing a web service to the first application client 111 of the terminal 110.

The edge data network 130 may transmit the HTML of the web page to the terminal 110, as a response to the request for the access to the web page from the terminal 110, in operation 204. The terminal 110 may display the web page based on the received HTML of the web page, in operation 205.

Figure 2B:
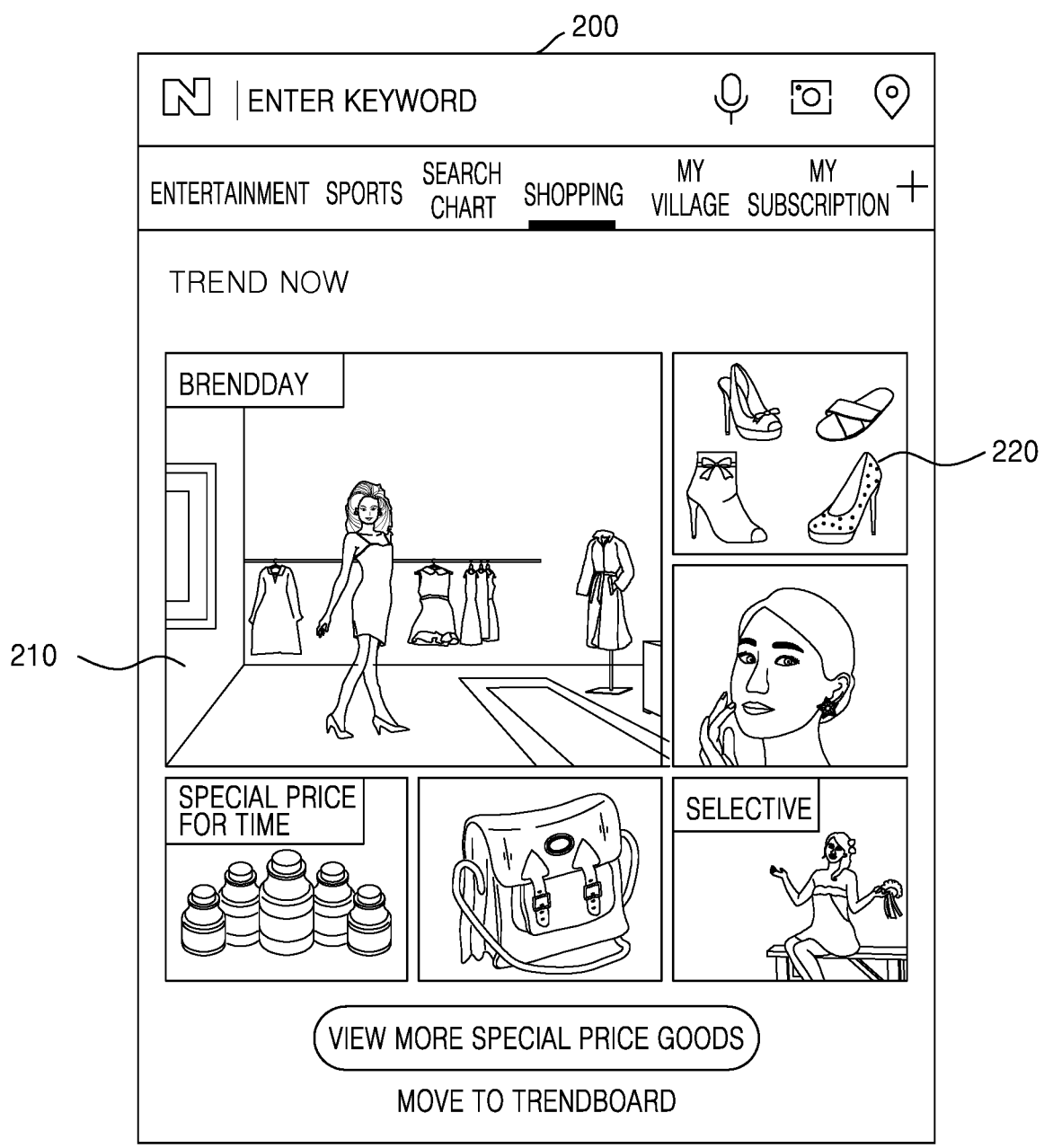
FIG. 2B is a diagram illustrating an example of a web page displayed on a terminal, according to various embodiments.

Referring to FIG. 2B, a web page 200 may include a plurality of pieces of content 210 and 220, and the terminal 110 may need to obtain the plurality of pieces of content 210 and 220 to display the web page 200. The HTML of the web page 200 may include URLs of the plurality of pieces of content 210 and 220 for displaying the web page 200. Content may be information (or data) provided on a web page, and include an image, document, video, HTML, cascading style sheets (CSS) document, Java Script, etc. Also, a URL of content may be a URL representing a location of the content on a network.

The terminal 110 may obtain the plurality of pieces of content 210 and 220 by using the URLs of the plurality of pieces of content 210 and 220. For example, the UE 110 may request the local DNS server to send IP addresses for the respective URLs of the plurality of pieces of content 210 and 220, and receive the IP addresses corresponding to the respective URLs of the plurality of pieces of content 210 and 220 from the local DNS server. The terminal 110 may request the plurality of pieces of content 210 and 220 by using the IP addresses. A domain name included in a URL of content for displaying the web page 200 may be identical to a domain name (for example, a domain name of a web server) included in a URL of the web page 200. The terminal 110 may receive the IP address of the edge data network 130 as an IP address for a URL of content for displaying the web page 200, from the local DNS server, according to the DNS table set in advance in the local DNS server as described above.

The terminal 110 may request the edge data network 130 to send the content for displaying the web page 200 by using the IP address of the edge data network 130. In this case, when the edge data network 130 has cached the content requested by the terminal 110, the edge data network 130 may transmit the cached content to the terminal 110. However, when the URL of the content included in the HTML of the web page 200 is included in the request for the content from the terminal 110, although the edge data network 130 has cached and stored the content, the edge data network 130 may need to perform a procedure for determining whether the content requested by the terminal 110 has been cached, and the procedure may cause a delay.

Also, when the edge data network 130 has not cached the content requested by the terminal 110, the edge data network 130 may need to obtain the content from the web server 140 and transmit the content to the terminal 110. Accordingly, when the edge data network 130 receives non-cached data from the web server 140 and transmits the data to the terminal 110, a delay may occur, compared to a case in which the terminal 110 directly requests the web server 140 to send the content and receives the content from the web server 140.

Accordingly, when the terminal 110 requests the edge data network 130 to send content based on the URL of the content included in the HTML of the web page 200, a delay may occur due to procedures that are performed in the edge data network 130. Accordingly, the present disclosure describes a method and system for reducing a delay that may occur in the edge data network 130 by modulating the HTML of the web page 200 in the edge data network 130 or adding a routing table in the DNS table of the local DNS server.

Figure 3:
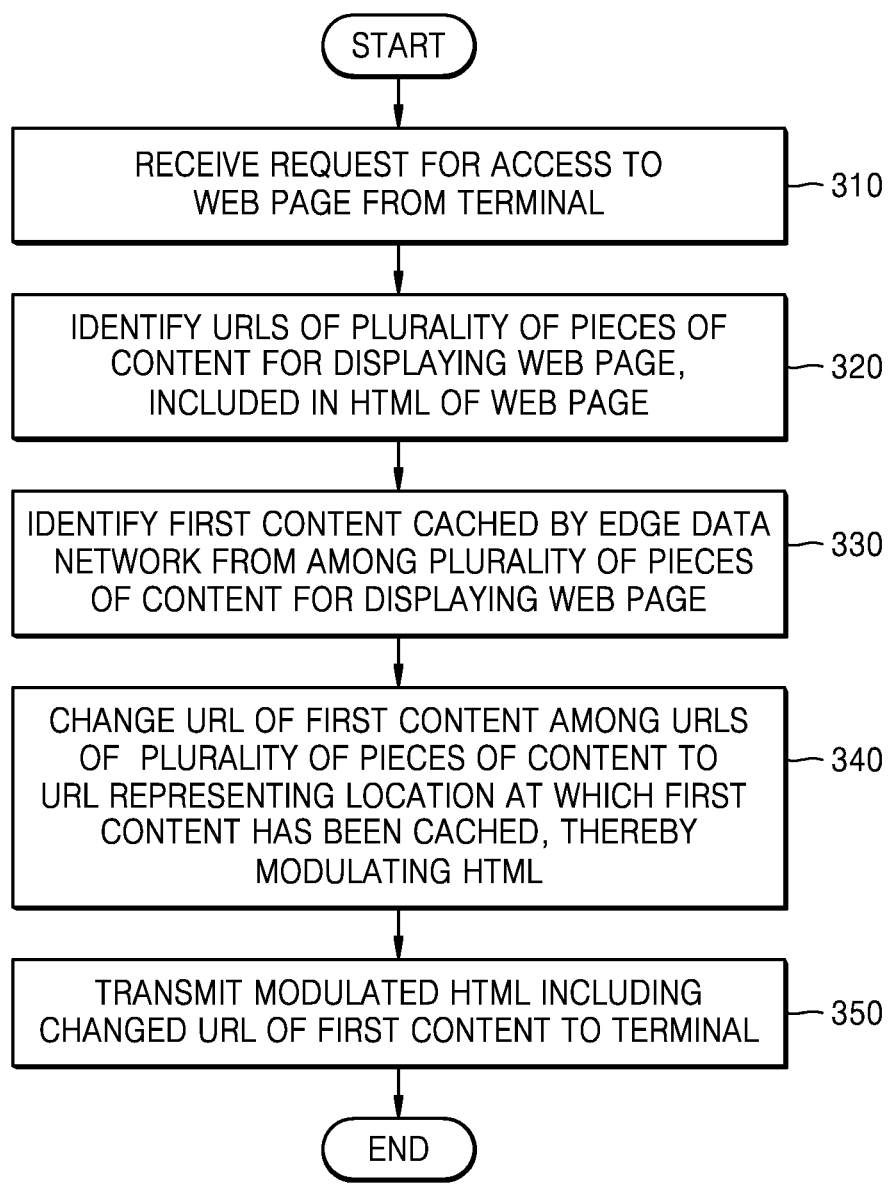
FIG. 3 is a flowchart illustrating an example method of providing a terminal with a modulated HTML of a web page by changing a uniform resource locator (URL) of content for displaying the web page in an edge data network according to various embodiments.

FIG. 3 is a flowchart illustrating an example method of providing a terminal with a modulated HTML of a web page by changing a URL of content for displaying the web page in an edge data network according to various embodiments.

Referring to FIG. 3, the edge data network 130 may receive a request for access to a web page from the terminal 110, in operation 310.

According to various embodiments of the disclosure, the request for the access to the web page from the terminal 110 may be a request for HTML of the web page from the terminal 110. The request for the access to the web page from the terminal 110 may be based on a URL of the web page and an IP address corresponding to a domain name included in the URL of the web page. In this case, the terminal 110 may obtain the IP address corresponding to the domain name included in the URL of the web page from a local DNS server, and, in a DNS table of the local DNS server, the IP address corresponding to the domain name included in the URL of the web page may be mapped to the IP address of the edge data network 130.

The edge data network 130 may identify URLs of a plurality of pieces of content for displaying the web page, included in the HTML of the web page, in operation 320.

According to various embodiments, the edge data network 130 may request the web server 140 providing the web page for which the terminal 110 has requested access to send the HTML of the web page, and receive the HTML of the web page from the web server 140.

According to various embodiments, the edge data network 130 may identify the plurality of pieces of content included in the HTML of the web page. The edge data network 130 may identify URLs of the plurality of pieces of content for displaying the web page from among a plurality of URLs included in the HTML of the web page.

For example, the edge data network 130 may identify which one of the plurality of URLs included in the HTML of the web page is a URL of content for displaying the web page, based on a tag (or an element) included in the HTML of the web page and information (for example, a name or format of a resource) representing a resource (or a file) included in the URL of the web page.

The edge data network 130 may identify first content cached by the edge data network 130 from among the plurality of pieces of content for displaying the web page, in operation 330.

According to various embodiments, the edge data network 130 may identify the first content cached by the edge data network 130 130 from among the plurality of pieces of content for displaying the web page, based on the URLs of the plurality of pieces of content for displaying the web page and information about a plurality of pieces of content cached by the edge data network 130.

For example, the edge data network 130 may have cached and stored a plurality of pieces of content. Also, the edge data network 130 may have stored information about URLs of the plurality of pieces of cached content, as information about the plurality of pieces of content, together with the plurality of pieces of cached content. The edge data network 130 may compare the URLs of the plurality of pieces of cached content to the URLs of the plurality of pieces of content for displaying the web page to identify a first URL corresponding to a URL of content cached by the edge data network 130 from among the URLs of the plurality of pieces of content for displaying the web page.

The identified first URL may be a URL of the first content cached by the edge data network 130, and the edge data network 130 may identify the first URL to identify the first content cached by the edge data network 130 from among the plurality of pieces of content for displaying the web page. Hereinafter, the first content may indicate content cached by the edge data network 130 among the plurality of pieces of content for displaying the web page, and the first content may be a plurality of pieces of content.

The edge data network 130 may change the URL of the first content among the URLs of the plurality of pieces of content to a URL representing a location at which the first content has been cached, thereby modulating the HTML, in operation 340.

According to various embodiments, the edge data network 130 may modulate the HTML of the web page. As described herein, modulating the HTML of the web page may refer, for example, to adding new information to the HTML or changing information included in the HTML. For example, the edge data network 130 may change a URL included in the HTML of the web page to thereby modulate the HTML of the web page. Herein, changing a URL may refer, for example, to changing information included in the URL to other information or adding new information to the URL. Hereinafter, the modulated HTML may refer, for example, to HTML of the web page, of which information has changed.

A URL may be a rule (or protocol) representing a location of an information resource (for example, content) on a network. The URL may include a protocol (for example, http, https, ftp, etc.) representing a communication rule for transmitting and receiving data on the network, a domain name (or IP address) of a server (or computer) at which an information resource is located, a file directory (or a file path or a folder in which a file is stored) of an information resource, a name (or file name) of an information resource, etc. Accordingly, changing the URL may refer, for example, to changing at least one of a protocol, a domain name, a file directory of an information resource, or a name of an information resource, included in the URL.

According to various embodiments, the edge data network 130 may change the information (for example, a domain name, a file directory of content, etc.) representing the location of the content included in the URL of the content. When content is requested by using a URL in which information representing a location of the content has changed, content may be requested from the changed location. Accordingly, by changing information representing a location (that is, a location of a server, a computer, etc.) of content among information included in a URL of the content included in the HTML of the web page, the edge data network 130 may cause the terminal 110 to request content located at a changed location based on the changed URL of the content.

According to various embodiments, the edge data network 130 may change the URL of the first content identified to have been cached by the edge data network 130 among the URLs of the plurality of pieces of content for displaying the web page, to a URL representing a location at which the first content has been cached. For example, the edge data network 130 may change information representing the location of the first content and included in the URL of the first content to information representing the location at which the first content has been cached, thereby changing the URL of the first content included in the HTML of the web page to the URL representing the location at which the first content has been cached.

According to various embodiments, the information representing the location of the first content and included in the URL of the first content may include a domain name of a web server providing the web page, and additionally include a file directory in the web server (or a computer of the web server).

According to various embodiments, the location at which the first content has been cached may be a server (or a computer of the server, hereinafter, also referred to as a cache server) in which the first content has been cached. The server in which the first content has been cached may be the edge data network 130, a cache server (for example, an edge data network storing cached content) connected to the edge data network 130, or a separate server.

According to various embodiments, the information representing the location at which the first content has been cached may include information about a server in which the first content has been cached or a server connected to the server in which the first content has been cached. For example, the information representing the location at which the first content has been cached may include a domain name of a server in which the first content has been cached, and additionally include a file directory of the first content in the server in which the first content has been cached. Also, when the first content has been cached in the edge data network 130, the information representing the location at which the first content has been cached may include a port number (for example, 21 in a file transfer protocol (FTP)) for accessing the first content. Also, the information representing the location at which the first content has been cached may include information about a server (for example, the edge data network 130 capable of accessing a cache server in which the first content has been cached) connected to a server in which the first content has been cached.

According to various embodiments, the edge data network 130 may change a domain name (for example, a domain name of a web server) included in the URL of the first content among the URLs included in the HTML of the web page to a domain name of a server in which the first content has been cached or a server connected to the server in which the first content has been cached. Thereby, the edge data network 130 may request the server in which the first content has been cached or the server connected to the server in which the first content has been cached to send the first content, based on the changed URL of the first content.

Also, the edge data network 130 may add the file directory of the first content in the server in which the first content has been cached to the URL of the first content, or change a file directory included in the URL of the first content to the file directory of the first content in the server in which the first content has been cached. Also, the edge data network 130 may add a port number for accessing the cached first content to the URL of the first content to represent a location at which the first content has been cached. Also, when a stored file name of the cached first content is different from a file name of the first content included in the URL of the first content, the edge data network 130 may change the file name of the first content to the stored file name of the cached first content.

The edge data network 130 may transmit modulated HTML including the changed URL of the first content to the terminal 110, in operation 350.

According to various embodiments, the edge data network 130 may transmit the modulated HTML to the terminal 110, as a response to the request for the access to the web page from the terminal 110, the request having been received in operation 310. The modulated HTML may include the URL (that is, the changed URL of the first content) representing the location at which the first content has been cached, instead of the URL of the first content included in the HTML of the web page received from the web server 140.

Figure 4:
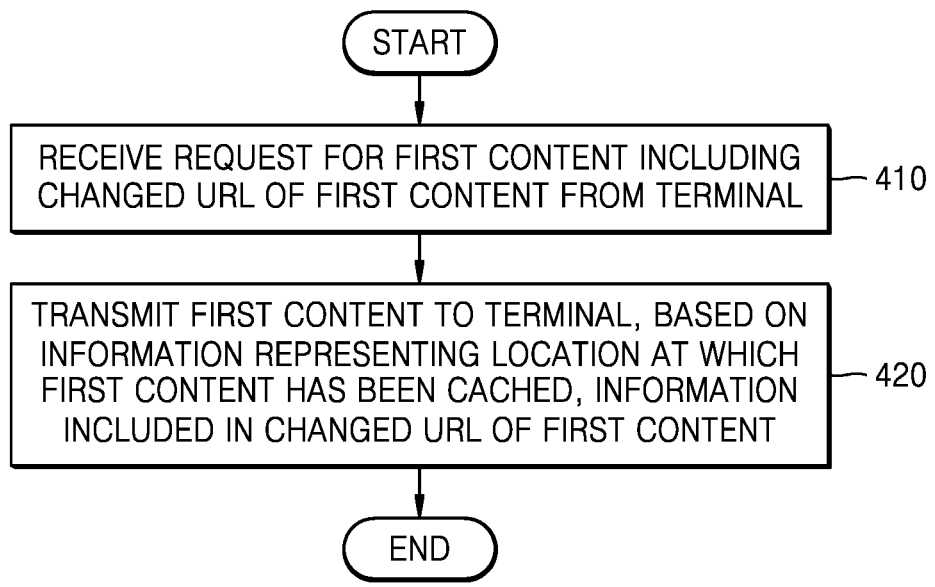
FIG. 4 is a flowchart illustrating an example method of providing a terminal with cached content based on a changed URL of content for displaying a web page in an edge data network, according to various embodiments.

FIG. 4 is a flowchart illustrating an example method of providing a terminal with cached content based on a changed URL of content for displaying a web page in an edge data network according to various embodiments. Operations of FIG. 4 may, for example, be performed after the edge data network 130 transmits the modulated HTML to the terminal 110 in operation 350 of FIG. 3.

Referring to FIG. 4, the edge data network 130 may receive a request for the first content including the changed URL of the first content from the terminal 110, in operation 410.

According to various embodiments, the request for the first content from the terminal 110 may be based on the changed URL of the first content. For example, the changed URL of the first content may be information representing a location at which the first content has been cached, and include the domain name of the edge data network 130. In this case, the edge data network 130 may be a server in which the first content has been cached or a server (that is, a cache server) capable of accessing the server in which the first content has been cached. The terminal 110 may obtain the IP address of the edge data network 130, as an IP address corresponding to the domain name of the edge data network 130 included in the changed URL of the first content, through the local DNS server 150. The terminal 110 may transmit a request for the first content including the changed URL of the first content to the edge data network 130 by using the IP address of the edge data network 130.

The edge data network 130 may transmit the first content to the terminal 110, based on the information representing the location at which the first content has been cached, the information included in the changed URL of the first content, in operation 420.

According to various embodiments, the edge data network 130 may identify the location at which the first content has been cached, based on the information representing the location at which the first content has been cached, the information included in the request from the terminal 110. For example, the edge data network 130 may identify the location at which the first content has been cached, based on at least one of the domain name of the edge data network 130, a file directory of the first content, or a port number for accessing the first content, included in the information representing the location at which the first content has been cached. The edge data network 130 may obtain the first content at the identified location at which the first content has been cached, and transmit the first content to the terminal 110. The first content transmitted from the edge data network 130 to the terminal 110 may have been transcoded by and stored in the edge data network 130. Details about caching and transcoding of the first content will be described below with reference to FIG. 9.

FIG. 4 relates to an example embodiment in which the changed URL of the first content includes the domain name of the edge data network 130. However, the first content may be cached in a cache server which the edge data network 130 is allowed to access, and the changed URL of the first content may include a domain name of the cache server. In this case, the terminal 110 may directly request the cache server in which the first content has been cached to send the first content, based on the domain name of the cache server, and receive the first content from the cache server.

As described herein, the edge data network 130 may change a URL of the first content cached by the edge data network 130 among a plurality of pieces of content for displaying the web page, before providing a HTML of the web page to the terminal 110, to cause the terminal 110 to request the first content by using the changed URL. Thus, procedures that are performed by the edge data network 130 when the terminal 110 requests the edge data network 130 to send the first content based on the URL (that is, a URL before changing) of the first content including information representing a location of a server (for example, the web server 140) providing the first content may be omitted. For example, a procedure of determining whether the edge data network 130 has cached requested data, a procedure of determining whether the edge data network 130 will cache the requested content, a procedure of obtaining the requested content through a web server, etc. may be omitted so that a delay may be reduced in providing the requested content to the terminal 110.

Figure 5:
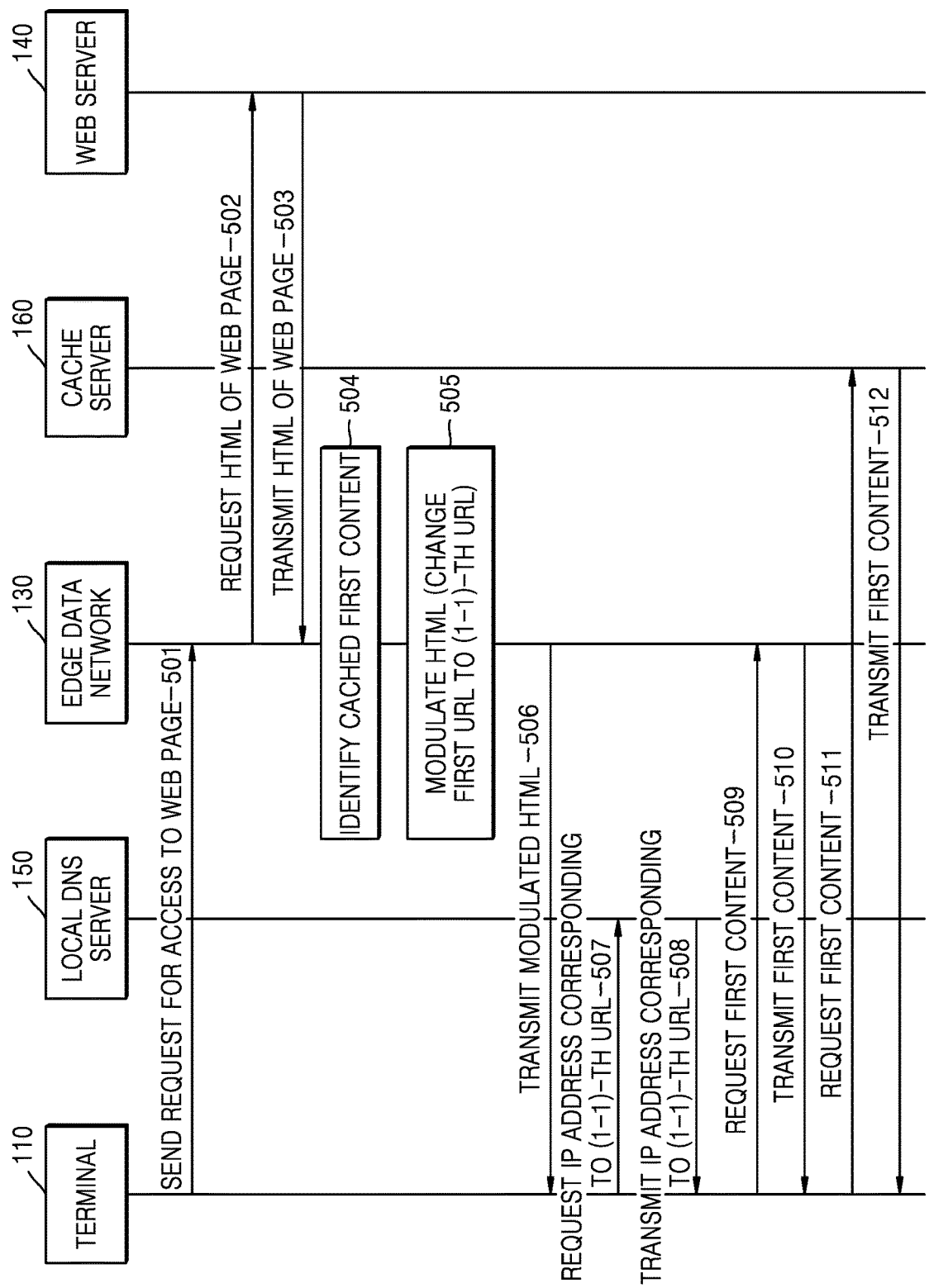
FIG. 5 is a signal flow diagram illustrating an example of providing a terminal with cached content of content for displaying a web page in an edge data network, according to various embodiments.

FIG. 5 is a signal flow diagram illustrating an example of providing a terminal with cached content of content for displaying a web page in an edge data network according to various embodiments.

Referring to FIG. 5, the terminal 110 may send a request for access to a web page to the edge data network 130, in operation 501. The edge data network 130 may request the web server 140 to send HTML of the web page requested by the terminal 110, in operation 502, and the web server 140 may transmit the HTML of the web page to the edge data network 130, in operation 503.

The edge data network 130 may identify URLs of a plurality of pieces of content for displaying the web page, the URLs being included in the HTML of the web page. The edge data network 130 may identify first content cached by the edge data network 130 from among the plurality of pieces of content for displaying the web page, in operation 504.

The edge data network 130 may change a URL (e.g., a first URL 511 (see FIG. 6)) of the identified first content to a URL (e.g., a (1-1)-th URL 521 (see FIG. 6)) representing a location at which the first content has been cached, thereby modulating the HTML of the web page, in operation 505.

Figure 6:
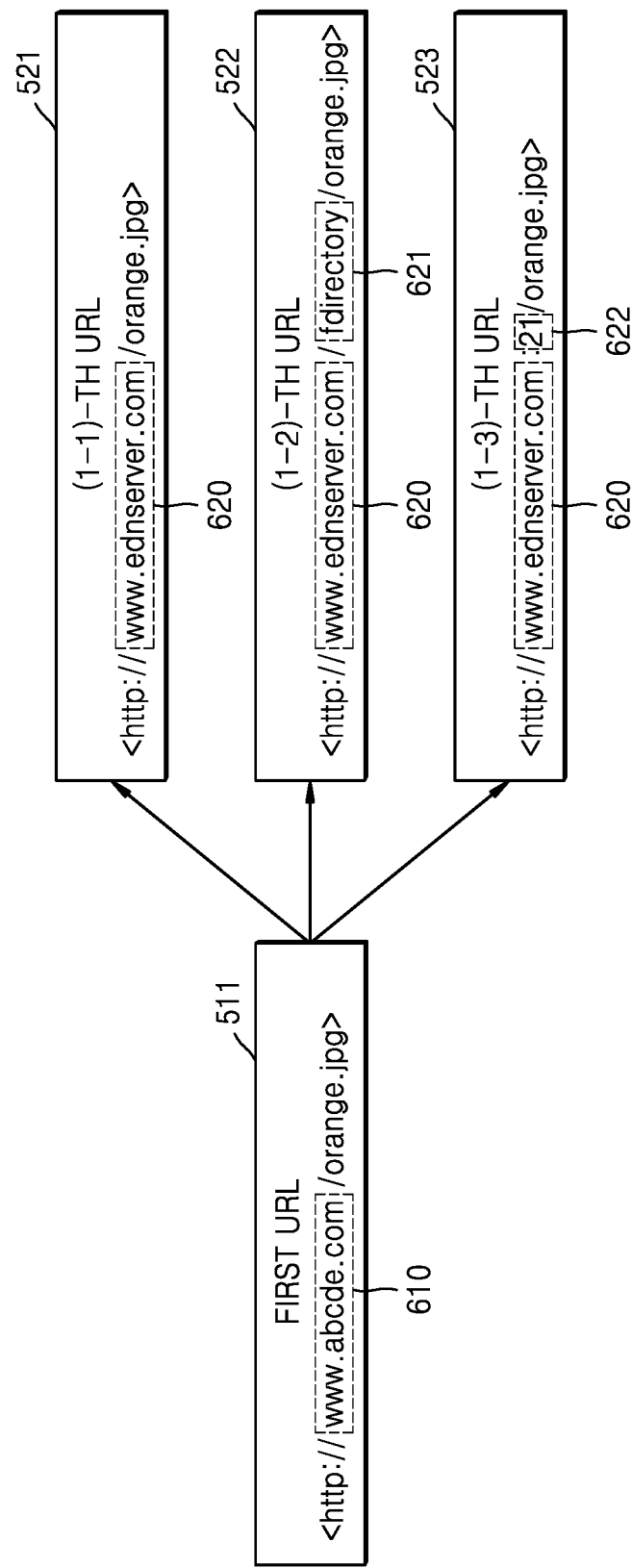
FIG. 6 is a diagram illustrating an example of changing a URL of content to a URL representing a location at which the content has been cached, according to various embodiments.

Referring to FIG. 6, the edge data network 130 may change the first URL 511 to the (1-1)-th URL 521 representing the location at which the first content has been cached. The first URL 511 may include a domain name 610 ("www.abcde.com") of the web server 140. The (1-1)-th URL 521 may be a URL obtained by changing the domain name 610 included in the first URL 511 to a domain name 620 ("www.ednserver.com") of a server (for example, the edge data network 130, a cache server, etc.) in which the first content has been cached or a server (for example, the edge data network 130) connected to the server in which the first content has been cached.

FIG. 5 relates to an example of changing the first URL 511 to the (1-1)-th URL 521. However, the first URL 511 may be changed to a (1-2)-th URL 522 or a (1-3)-th URL 523 representing a location at which the first content has been cached, or the first URL 511 may be changed to another URL, different from the above-described examples, according to a location at which the first content has been cached.

For example, referring to FIG. 6, the edge data network 130 may change the domain name 610 included in the first URL 511 to the domain name 620 of the server (for example, the edge data network 130) in which the first content has been cached, and add a file directory 621 ("fdirectory") of the first content in the server in which the first content has been cached to the first URL 511, thereby changing the first URL 511 to the (1-2)-th URL 522 representing a location at which the first content has been cached.

Alternatively, the edge data network 130 may change the domain name 610 included in the first URL 511 to the domain name 620 of the server (for example, the edge data network 130) in which the first content has been cached, and add a port number 622 ("21") for accessing the cached first content to the first URL 511, thereby changing the first URL 511 to the (1-3)-th URL 523 representing a location at which the first content has been cached.

Referring again to FIG. 5, the edge data network 130 may transmit the modulated HTML including the (1-1)-th URL 521 to the terminal 110, in operation 506. The terminal 110 may display the web page based on the modulated HTML. At this time, the terminal 110 may need to obtain the first content to display the web page. Accordingly, the terminal 110 may request the local DNS server 150 to send an IP address corresponding to the changed URL (that is, the (1-1)-th URL 521) of the first content included in the modulated HTML, in operation 507, and the local DNS server 150 may transmit an IP address corresponding to a domain name included in the (1-1)-th URL 521 to the terminal 110, in operation 508. The IP address corresponding to the domain name included in the (1-1)-th URL 521 may be an IP address corresponding to the domain name of the edge data network 130 or the domain name of the cache server 160 connected to the edge data network 130.

When the IP address received by the terminal 110 from the local DNS server 150 is the IP address of the edge data network 130, the terminal 110 may request the edge data network 130 to send the first content by using the IP address received from the local DNS server 150, in operation 509. At this time, the request for the first content from the terminal 110 may include the (1-1)-th URL 521.

When the edge data network 130 receives the request from the terminal 110, the edge data network 130 may identify a location at which the first content has been cached, based on information representing the location at which the first content has been cached and included in the (1-1)-th URL 521. The edge data network 130 may obtain the first content at the location at which the first content has been cached and transmit the first content to the terminal 110, in operation 510.

When the IP address received by the terminal 110 from the local DNS server 150 is the IP address of the cache server 160, the terminal 110 may request the cache server 160 to send the first content by using the IP address received from the local DNS server 150, in operation 511. In this case, the request for the first content from the terminal 110 may include the (1-1)-th URL 521.

When the cache server 160 receives the request from the terminal 110, the cache server 160 may identify a location at which the first content has been cached, based on information representing the location at which the first content has been cached and included in the (1-1)-th URL 521. The cache server 160 may obtain the first content at the location at which the first content has been cached and transmit the first content to the terminal 110, in operation 512.

Figure 7:
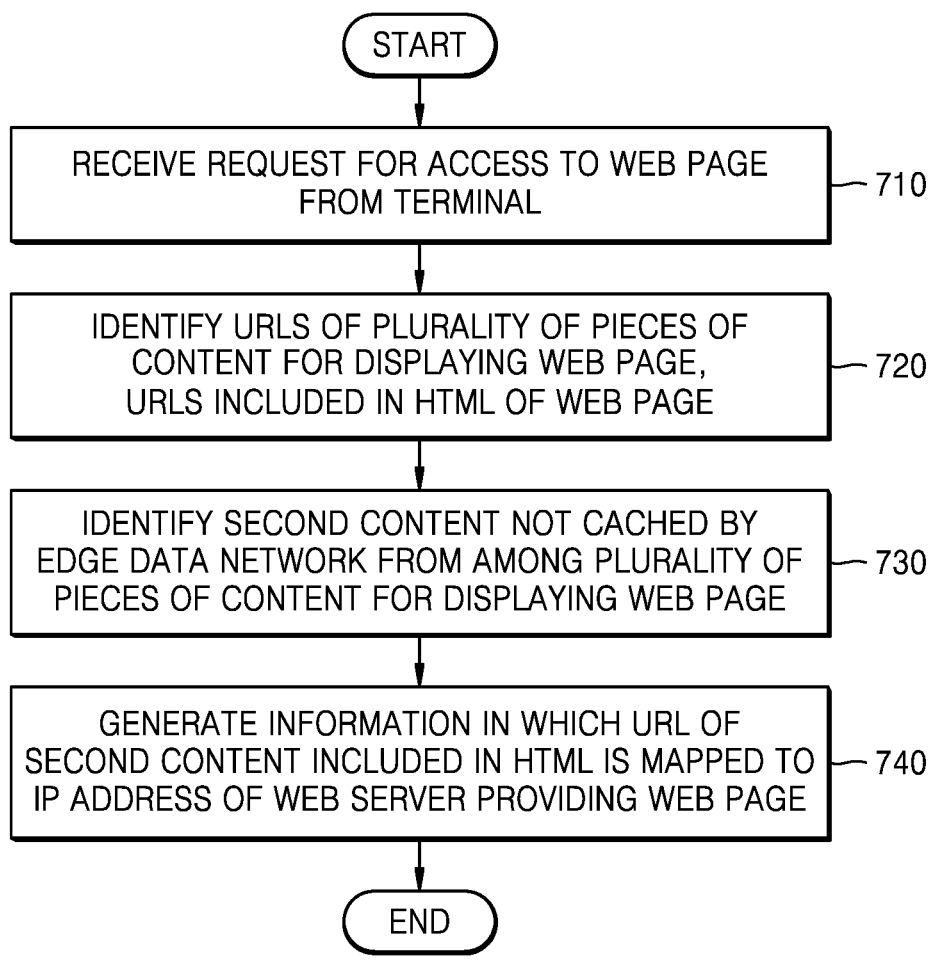
FIG. 7 is a flowchart illustrating an example method of routing a terminal's request path for non-cached content among content for displaying a web page in an edge data network, according to various embodiments.

FIG. 7 is a flowchart illustrating an example method of routing a terminal's request path for non-cached content among content for displaying a web page in an edge data network according to various embodiments. In the following description with reference to FIG. 7, descriptions overlapping with those given above with reference to FIG. 3 will be omitted.

Referring to FIG. 7, the edge data network 130 may receive a request for access to a web page from the terminal 110, in operation 710.

The edge data network 130 may identify URLs of a plurality of pieces of content for displaying the web page, the URLs being included in HTML of the web page, in operation 720.

The edge data network 130 may identify second content that has not been cached by the edge data network 130 from among the plurality of pieces of content for displaying the web page, in operation 730.

According to various embodiments, the edge data network 130 may identify the second content that has not been cached by the edge data network 130 from among the plurality of pieces of content for displaying the web page, based on the URLs of the plurality of pieces of content for displaying the web page and information about a plurality of pieces of content cached by the edge data network 130.

For example, the edge data network 130 may have cached and stored a plurality of pieces of content. The edge data network 130 may have stored information about URLs of the plurality of pieces of cached content as the information about the plurality of pieces of content, together with the plurality of pieces of cached content. The edge data network 130 may identify a second URL not corresponding to any one of the URLs of the plurality of pieces of cached content from among the URLs of the plurality of pieces of content for displaying the web page.

The identified second URL may be a URL of the second content not cached by the edge data network 130, and the edge data network 130 may identify the second URL to thereby identify the second content that has not been cached by the edge data network 130 from among the plurality of pieces of content for displaying the web page. Hereinafter, the second content may refer to content not cached by the edge data network 130 among the plurality of pieces of content for displaying the web page, and the second content may be a plurality of pieces of content.

The edge data network 130 may generate information in which the URL of the second content included in the HTML of the web page is mapped to an IP address of a web server providing the web page in operation 740.

According to various embodiments, the information (hereinafter, referred to as routing information) in which the URL of the second content is mapped to the IP address of the web server providing the web page may be used to route a request for the second content from the terminal 110 using the URL of the second content to the web server 140. The routing may be setting or changing a path of traffic (for example, data, information, requests, etc.) in a network.

For example, the terminal 110 may request the second content by using the URL of the second content included in the HTML of the web page. In this case, in the DNS table of the local DNS server, an IP address corresponding to a domain name (for example, a domain name of the web server 140) included in the URL of the second content may have been mapped to an IP address of the edge data network 130 or an IP address of a routing server. Accordingly, the terminal 110 may send a request for the second content to the edge data network 130 or the routing server connected to the edge data network 130, according to the IP address mapped to the URL of the second content in the DNS table. The routing server may be a server connected to the edge data network 130 to determine whether to route requests, data, etc. received from the terminal 110, etc. to the edge data network 130 and route traffic to the edge data network 130 or another server.

According to various embodiments of the disclosure, the edge data network 130 may set a traffic rule by using generated routing information such that the request for the second content based on the URL of the second content is routed to the web server 140. In this case, when the terminal 110 sends a request for the second content by using the URL of the second content to the edge data network 130, the edge data network 130 may transfer the request for the second content from the terminal 110 to the web server 140 according to the traffic rule.

By setting the traffic rule based on the generated routing information, the edge data network 130 may transfer the request from the terminal 110 to the web server 140 providing the second content without performing a procedure of determining whether the second content has been cached in response to the request for the second content not cached by the edge data network 130 from the terminal 110, a procedure of determining whether to cache the requested content, a procedure of obtaining the requested content through the web server 140, etc., and cause the web server 140 to directly transfer the second content to the terminal 110, thereby reducing a delay.

According to various embodiments, the edge data network 130 may set a traffic rule of the routing server connected to the edge data network 130 by using the generated routing information such that a request for the second content based on the URL of the second content is routed to the web server 140. In this case, when the request for the second content based on the URL of the second content is transferred to the routing server, the routing server may route the request for the second content from the terminal 110 to the web server 140 according to the set traffic rule.

By setting the traffic rule of the routing server based on the generated routing information in the edge data network 130, the request for the second content not cached by the edge data network 130 from the terminal 110 may be directly transferred to the web server 140, without being transferred to the edge data network 130, which reduces a delay.

Figure 8:
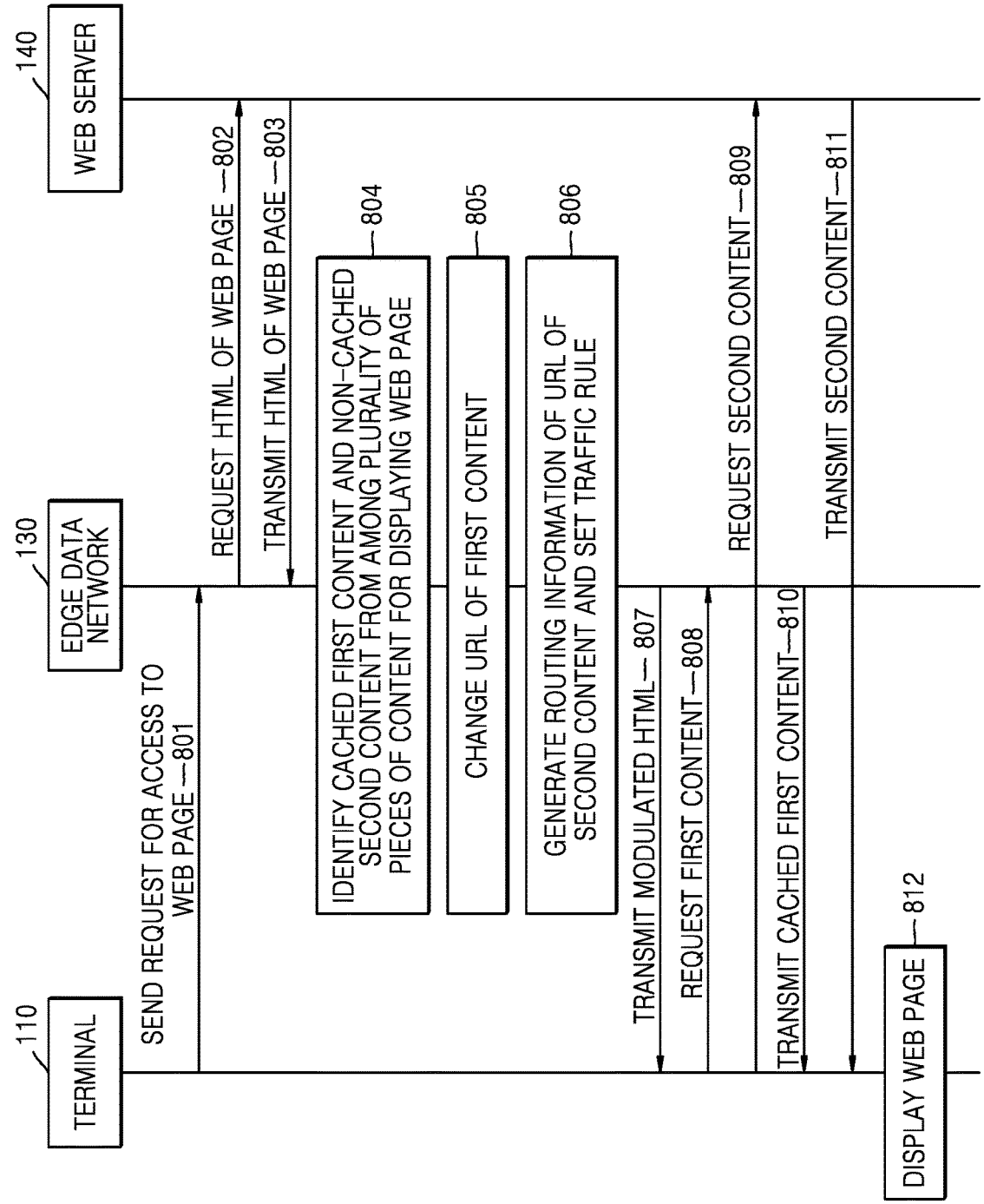
FIG. 8 is a signal flow diagram illustrating an example procedure for operations between a terminal, an edge data network, and a web server for displaying a web page in the terminal according to various embodiments.

FIG. 8 is a signal flow diagram illustrating an example procedure for operations between a terminal, an edge data network, and a web server for displaying a web page in the terminal, according to various embodiments. In the following description with reference to FIG. 8, descriptions overlapping with those given above with reference to FIGS. 3 to 7 will be omitted.

Referring to FIG. 8, the terminal 110 may send a request for access to a web page to the edge data network 130, in operation 801. The edge data network 130 may request the web server 140 to send HTML of the web page requested by the terminal 110, in operation 802. The web server 140 may transmit the HTML of the web page requested by the edge data network 130 to the edge data network 130, in operation 803.

The edge data network 130 may identify URLs of a plurality of pieces of content for displaying the web page from among a plurality of URLs included in the received HTML of the web page. The edge data network 130 may identify first content cached by the edge data network 130 and second content not cached by the edge data network 130 from among the plurality of pieces of content for displaying the web page, in operation 804.

The edge data network 130 may change a URL of the first content included in the HTML of the web page to a URL representing a location at which the first content has been cached, thereby modulating the HTML of the web page, in operation 805.

In operation 806, the edge data network 130 may generate information (that is, routing information) in which a URL of the second content included in the HTML of the web page is mapped to an IP address of the web server 140 providing the web page. The edge data network 130 may also set a traffic rule of the edge data network 130 or a routing server connected to the edge data network 130, based on the generated routing information, such that a request for the second content based on the URL of the second content is routed to the web server 140.

The edge data network 130 may transmit the modulated HTML of the web page including the changed URL of the first content to the terminal 110, in operation 807. The terminal 110 may request the edge data network 130 to send the first content by using the changed URL of the first content included in the modulated HTML, in operation 808. Also, the terminal 110 may request the second content by using the URL of the second content, and send a request for the second content to the web server 140 according to the traffic rule set based on the generated routing information, in operation 809.

The edge data network 130 may identify the location at which the first content has been cached, based on the information included in the URL representing the location at which the first content has been cached, the URL being included in the request for the first content from the terminal 110, and transmit the first content stored at the location at which the first content has been cached to the terminal 110, in operation 810. The web server 140 may transmit the second content to the terminal 110, as a response to the request for the second content from the terminal 110, in operation 811.

The terminal 110 may display the web page by using the HTML of the web page, the received first content, and the received second content, in operation 812.

Figure 9:
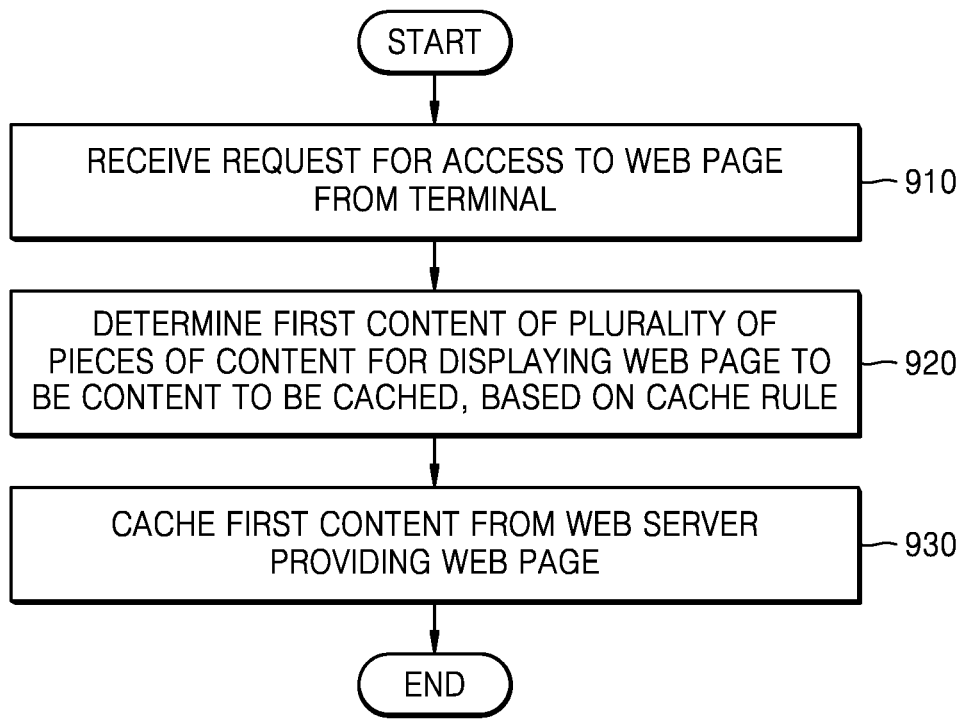
FIG. 9 is a flowchart illustrating an example method of caching content from a web server in an edge data network, according to various embodiments.

FIG. 9 is a flowchart illustrating an example method of caching content from a web server in an edge data network according to various embodiments. The embodiment of FIG. 9 discloses a method of caching the first content in the edge data network 130, which may, for example, be performed before the various embodiments of FIGS. 3 to 8.

Referring to FIG. 9, the edge data network 130 may receive a request for access to a web page from the terminal 110, in operation 910.

According to various embodiments, the edge data network 130 may request the web server 140 to send HTML of the web page to which the terminal 110 has requested access, and receive the HTML of the web page from the web server 140. The edge data network 130 may identify a plurality of pieces of content for displaying the web page, based on URLs of the plurality of pieces of content for displaying the web page, the URLs being included in the HTML of the web page.

The edge data network 130 may determine the first content of the plurality of pieces of content for displaying the web page, to be content which the edge data network 130 will cache, based on a cache rule, in operation 920.

According to various embodiments, the cache rule may be set based on at least one of information about sizes of content, information about times at which content has been generated, or the numbers of times by which content has been requested. For example, a cache rule of caching content when a size of the content is greater than (or smaller than) or equal to a predefined size may be set. Also, a cache rule of caching content when a time period elapsed from a generation time of the content to a current time is longer than or equal to a predefined time period may be set. Also, a cache rule of caching content when the number of times by which the content is requested is more than or equal to a predefined number of times may be set. The number of times by which content is requested may increase when the content is directly requested to the edge data network 130 or a web page including the content is requested to the edge data network 130. The edge data network 130 may calculate and store the number of times by which each piece of content is requested. Also, although a plurality of pieces of content satisfy the cache rule, caching priorities of the plurality of pieces of content may be determined according to priorities set in advance in the cache rule, and part of the plurality of pieces of content may be cached. The cache rule may be set by the edge data network 130 or another external server.

According to various embodiments, the edge data network 130 may determine content (for example, the first content) satisfying the cache rule among the plurality of pieces of content for displaying the web page, to be content that the edge data network 130 will cache, based on information (for example, the URLs of the plurality of pieces of content, information about the content included in the HTML, etc.) about the plurality of pieces of content for displaying the web page.

According to various embodiments, the edge data network 130 may determine content (for example, content connected to the first content through a link, content included in the web page and connected to the first content through a link, etc.) connected to the first content determined to be content that the edge data network 130 will cache, to also be content that the edge data network 130 will cache. Whether to cache the content connected to the first content may, for example, be determined based on the cache rule. For example, a cache rule about whether to cache content connected to content determined to be cached may be set. Accordingly, the edge data network 130 may determine the content connected to the first content to also be content that the edge data network 130 will cache, together with the first content, based on the cache rule.

According to various embodiments, the edge data network 130 may determine content for displaying other web pages connected (to the web page) through a plurality of links (for example, URLs of the other web pages) included in the HTML of the web page, to be content that the edge data network 130 will cache, in addition to the plurality of pieces of content for displaying the web page. For example, a cache rule may be set for caching, when the number of times by which a link included in the HTML of the web page is requested is more than or equal to a predefined number of times, content required for displaying a web page connected (to the web page) through the link.

The edge data network 130 may cache the first content from the web server 140 providing the web page, in operation 930.

According to various embodiments, the edge data network 130 may request the web server 140 to send the first content determined to be content that the edge data network 130 will cache. The edge data network 130 may receive the first content from the web server 140, and store the received first content. The edge data network 130 may store the first content in the internal storage space, a cache server connected to the edge data network 130, etc.

According to various embodiments, the edge data network 130 may store information about the first content, together with the first content cached from the web server 140. For example, the edge data network 130 may store a URL of the first content included in the HTML of the web page, information about the first content received from the web server 140, etc., together with the first content. The information stored together with the first content may be used to determine whether the edge data network 130 has cached the first content.

According to various embodiments, the edge data network 130 may transcode the first content received from the web server 140. The edge data network 130 may store the transcoded first content. Transcoding may, for example, refer to processing, selecting, or converting content to be suitable for a specific environment. For example, transcoding content may be converting a size, format, etc. of the content by considering performance of the terminal 110, a web browser environment of the terminal 110, a network state of the terminal 110, etc. For example, the edge data network 130 may convert a size of the first content received from the web server 140 to a size capable of being appropriately used by the terminal 110.

The edge data network 130 may receive content for displaying the web page in advance from the web server 140, transcode the received content, and store the transcoded content. Accordingly, the edge data network 130 may transmit, when the terminal 110 requests the content, the stored, transcoded content to the terminal 110, thereby reducing a delay that may be generated when transcoding the content.

Figure 10:
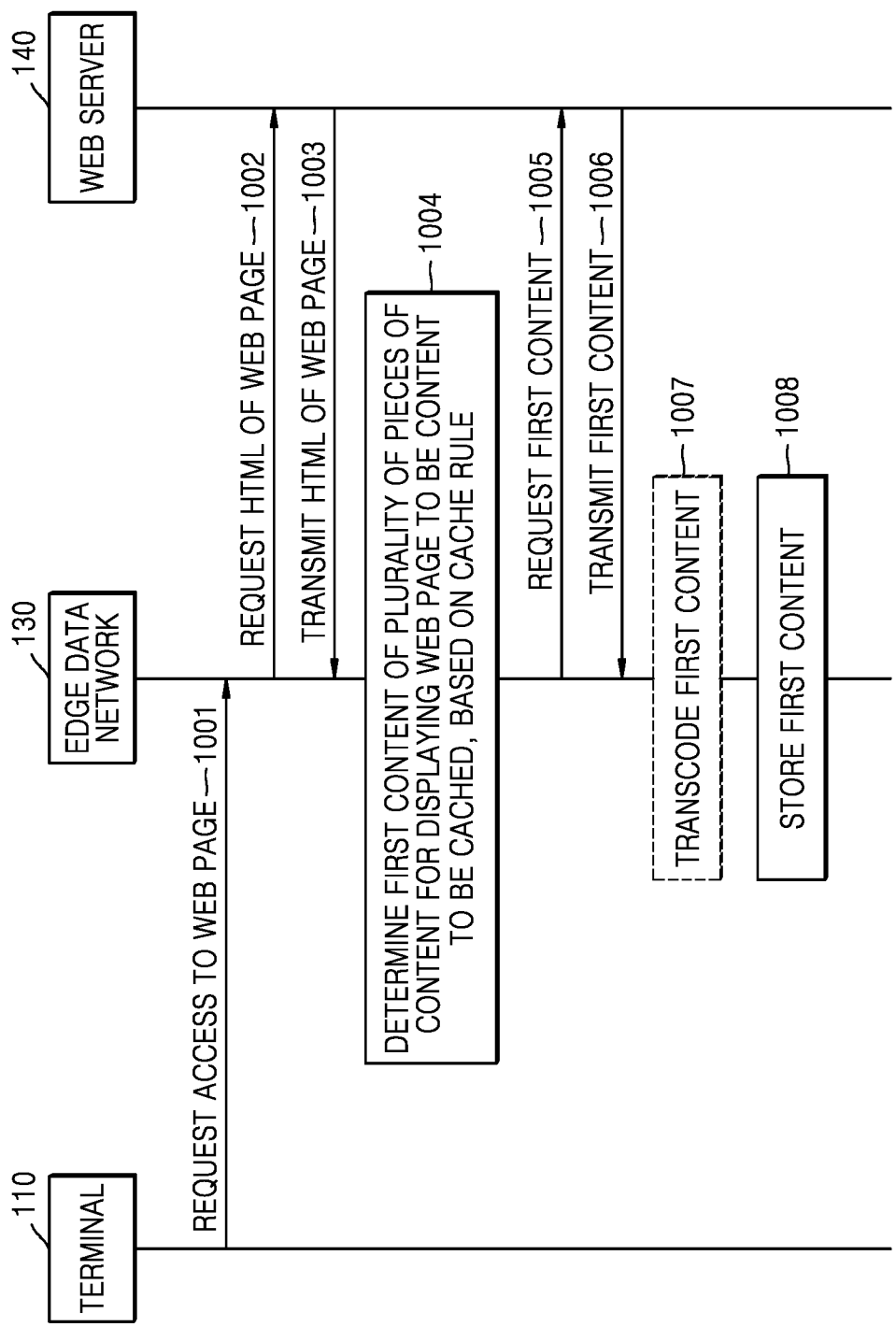
FIG. 10 is a signal flow diagram illustrating an example procedure for operations between a terminal, an edge data network, and a web server for caching content from the web server in the edge data network according to various embodiments.

FIG. 10 is a signal flow diagram illustrating an example procedure for operations between a terminal, an edge data network, and a web server for caching content from the web server in the edge data network, according to various embodiments. In the following description with reference to FIG. 10, descriptions overlapping with those given above with reference to FIG. 9 will be omitted.

Referring to FIG. 10, the terminal 110 may send a request for access to a web page to the edge data network 130, in operation 1001. The edge data network 130 may request the web server 140 to send HTML of the web page requested by the terminal 110, in operation 1002. The web server 140 may transmit the HTML of the web page requested by the edge data network 130 to the edge data network 130, in operation 1003.

The edge data network 130 may identify a plurality of pieces of content for displaying the web page to which the terminal 110 has requested access, based on URLs of a plurality of pieces of content included in the received HTML of the web page. The edge data network 130 may determine first content of the plurality of pieces of content for displaying the web page to be content that the edge data network 130 will cache, based on a cache rule, in operation 1004.

The edge data network 130 may request the web server 140 to send the first content, in operation 1005. The web server 140 may transmit the first content to the edge data network 130, in operation 1006.

The edge data network 130 may transcode the first content received from the web server 140, in operation 1007. Operation 1007 is optional and may be omitted. The edge data network 130 may store the first content received from the web server 140 in the internal storage space or a cache server connected to the edge data network 130, in operation 1008. In this case, after the edge data network 130 transcodes the first content received from the web server 140, the edge data network 130 may store the transcoded first content. Operations 1005 to 1008 may represent a procedure of caching the first content from the web server 140 in the edge data network 130. When the edge data network 130 receives a request for the first content from the terminal 110, etc., the edge data network 130 may transmit the stored (that is, cached) first content to the terminal 110, etc.

Figure 11:
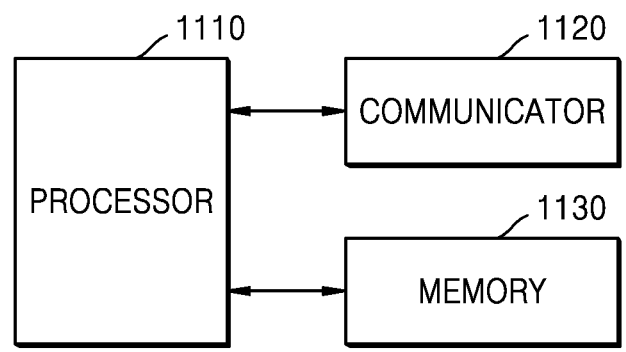
FIG. 11 is a block diagram illustrating an example configuration of an edge data network according to various embodiments.

FIG. 11 is a block diagram illustrating an example configuration of an edge data network according to various embodiments.

As shown in FIG. 11, the edge data network 130 according to the disclosure may include a processor (e.g., including processing circuitry) 1110, a communicator (e.g., including communication circuitry) 1120, and a memory 1130. However, components of the edge data network 130 are not limited to the above-mentioned examples. For example, the edge data network 130 may include more components or fewer components than the above-mentioned components. Also, the processor 1110, the communicator 1120, and the memory 1130 may be implemented in a form of a single chip.

According to various embodiments, the processor 1110 may include various processing circuitry and control a series of processes for operating the edge data network 130 according to embodiments of the disclosure described above. For example, the processor 1110 may control the components of the edge data network 130 to perform a method of providing a web service, according to various embodiments. The processor 110 may include a plurality of processors, and execute a program stored in the memory 1130 to perform the above-described operations for providing the web service according to the various embodiments.

The communicator 1120 may include various communication circuitry and transmit/receive signals to/from an external device (for example, the terminal 110, the access network 120, the service server 140 (for example, a web server), a 3GPP network, etc.) A signal transmitted/received to/from the external device may include control information and data. For example, a signal transmitted/received to/from the external device may be a request for access to a web page from the terminal 110, HTML and content that are to be transmitted to the terminal 110, HTML and content of a web page received from the web server 140, a signal transmitted/received to/from a cache server, etc. The communicator 1120 may include an RF transmitter for up-converting and amplifying a frequency of a signal that is to be transmitted, an RF receiver for low-noise amplifying a received signal and down-converting a frequency of the received signal, etc. However, the above-described configuration is merely an example of the communicator 1120, and components of the communicator 1120 are not limited to the RF transmitter and the RF receiver. Also, the communicator 1120 may receive a signal through a wireless channel, output the signal to the processor 1110, and transmit a signal output from the processor 1110 through the wireless channel.

According to various embodiments, the memory 1130 may store programs and data required for operations of the edge data network 130. Also, the memory 1130 may store control information or data included in a signal that is received by or transmitted from the edge data network 130. The memory 1130 may be configured with a storage medium, such as read only memory (ROM), random access memory (RAM), a hard disk, compact-disk ROM (CD-ROM), and a digital versatile disk (DVD), or a combination of such storage media. Also, the memory 1130 may refer to a plurality of memories. According to various embodiments, the memory 1130 may store a program for performing an operation of providing a web service as described in the present disclosure. Also, the memory 1130 may store cached content, information about the cached content, etc.

The methods according to the various embodiments of the disclosure described in claims or disclosure thereof may be implemented in hardware, software, or a combination of hardware and software.

When the methods are implemented in software, a computer-readable storage medium or a computer program product storing at least one program (software module) may be provided. The at least one program stored in the computer-readable storage medium or the computer program product may be configured for execution by at least one processor in an electronic device. The at least one program may include instructions that cause the electronic device to execute the methods according to the embodiments of the disclosure.

The program (software module or software) may be stored in RAM, a non-volatile memory including a flash memory, ROM, an electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. Also, each configured memory may include a plurality of memories.

Furthermore, the program may be stored in an attachable storage device that may be accessed through communication networks, such as the Internet, Intranet, a local area network (LAN), a wide LAN (WLAN), and a storage area network (SAN), or a communication network configured in a combination thereof. The storage device may access a device performing the embodiments of the disclosure through an external port. Further, a separate storage device on the communication network may also access a device performing the embodiments of the disclosure.

In the disclosure, the terms "computer program product" or "computer-readable medium" may be used to collectively indicate a memory, a hard disk installed in a hard disk drive, and a medium such as a signal. The "computer program product" or "computer-readable medium" may provide a computer system with software configured with instructions for receiving, from the terminal, a request for access to a web page, identifying uniform resource locators (URLs) of a plurality of pieces of content for displaying the web page, the URLs being included in a hypertext markup language (HTML) of the web page, identifying first content cached by the edge data network from among the plurality of pieces of content for displaying the web page, modulating the HTML by changing a URL of the first content among the URLs of the plurality of pieces of content to a URL representing a location at which the first content is cached, and transmitting the modulated HTML including the changed URL of the first content to the terminal.

The embodiments of the disclosure may provide an apparatus and method capable of effectively performing MEC based services.

In the detailed embodiments of the disclosure described above, components included in the disclosure have been expressed in the singular or plural according to the detailed embodiments. However, the expression in the singular or plural is appropriately selected for the situation suggested for convenience of description, and the disclosure is not limited to a single component or a plurality of components. Even the components expressed in the plural may be configured as a single component, or even the component expressed in the singular may be configured as plural components.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and equivalents thereof.

What is claimed is:

1. A method, performed by an edge data network, of providing a web service to a terminal, the method comprising:
   receiving, from the terminal, a request for access to a web page;
   identifying uniform resource locators (URLs) of a plurality of pieces of content for displaying the web page, the URLs being included in a hypertext markup language (HTML) of the web page;
   identifying, from among the plurality of pieces of content for displaying the web page, first content cached by the edge data network and second content which is not cached by the edge data network;
   modulating the HTML by changing a URL of the first content among the URLs of the plurality of pieces of content to a URL representing a location at which the first content is cached;
   generating information in which a URL of the second content, included in the HTML, is mapped to an internet protocol (IP) address of a web server providing the web page; and
   transmitting the modulated HTML including the changed URL of the first content to the terminal,
   wherein the generated information is used to route a request for the second content from the terminal using the URL of the second content to the web server.

2. The method of claim 1, wherein the changing of the URL of the first content to the URL representing the location at which the first content is cached comprises changing information representing a location of the first content and included in the URL of the first content to information representing the location at which the first content is cached,
   wherein the changed URL of the first content includes the information representing the location at which the first content is cached.

3. The method of claim 2, wherein the information representing the location at which the first content is cached includes at least one of a domain name, a port number, or a file directory, representing the location at which the first content is cached.

4. The method of claim 2, wherein the first content is cached in the edge data network or another edge data network connected to the edge data network, the information representing the location at which the first content is cached includes a domain name of the edge data network, and the changing of the URL of the first content to the URL representing the location at which the first content is cached comprises changing a domain name included in the URL of the first content to the domain name of the edge data network.

5. The method of claim 2, further comprising:

receiving, from the terminal, a request for the first content including the changed URL of the first content; and transmitting the first content to the terminal, based on the information representing the location at which the first content is cached, the information being included in the changed URL of the first content.

6. The method of claim 1, further comprising:

determining the first content of the plurality of pieces of content to be content to be cached, based on a cache rule; and caching the first content from the web server providing the web page, wherein the cache rule is set based on at least one of information about sizes of content, information about times at which content has been generated, or information about the numbers of times the edge data network has been requested for content.

7. The method of claim 6, wherein the caching of the first content comprises:

requesting the web server to send the first content;

receiving the first content from the web server; and storing the first content.

8. The method of claim 7, wherein the caching of the first content further comprises:

transcoding the first content, and the storing of the first content comprises storing the transcoded first content.

9. The method of claim 1, wherein the identifying of the first content cached by the edge data network comprises identifying the first content cached by the edge data network from among the plurality of pieces of content for displaying the web page, based on the URLs of the plurality of pieces of content for displaying the web page and information about a plurality of pieces of content cached by the edge data network.

10. An edge data network for providing a web service to a terminal, the edge data network comprising:

a communicator including communication circuitry;

a memory storing a plurality of instructions; and a processor configured to execute the plurality of instructions to:

receive, from the terminal, a request for access to a web page, identify uniform resource locators (URLs) of a plurality of pieces of content for displaying the web page, the URLs being included in a hypertext markup language (HTML) of the web page, identify, from among the plurality of pieces of content for displaying the web page, first content cached by the edge data network and second content which is not cached by the edge data network, modulate the HTML by changing a URL of the first content among the URLs of the plurality of pieces of content to a URL representing a location at which the first content is cached, generate information in which a URL of the second content, included in the HTML, is mapped to an internet protocol (IP) address of a web server providing the web page, and transmit the modulated HTML including the changed URL of the first content to the terminal, wherein the generated information is used to route a request for the second content from the terminal using the URL of the second content to the web server.

11. The edge data network of claim 10, wherein the processor is further configured to execute the plurality of instructions to change information representing a location of the first content and included in the URL of the first content, to information representing the location at which the first content is cached, wherein the changed URL of the first content includes the information representing the location at which the first content is cached.

12. The edge data network of claim 11, wherein the information representing the location at which the first content is cached includes at least one of a domain name, a port number, or a file directory, representing the location at which the first content is cached.

13. The edge data network of claim 11, wherein the first content is cached by the edge data network or another edge data network connected to the edge data network, the information representing the location at which the first content is cached includes a domain name of the edge data network or the other edge data network, and the processor is further configured to execute the plurality of instructions to change a domain name included in the URL of the first content to the domain name of the edge data network.

14. The edge data network of claim 11, wherein the processor is further configured to execute the plurality of instructions to:

receive, from the terminal, a request for the first content including the changed URL of the first content, and transmit the first content to the terminal, based on the information representing the location at which the first content is cached, the information being included in the changed URL of the first content.

15. The edge data network of claim 10, wherein the processor is further configured to execute the plurality of instructions to:

determine the first content of the plurality of pieces of content to be content to be cached, based on a cache rule, and cache the first content from the web server providing the web page, wherein the cache rule is set based on at least one of information about sizes of content, information about times at which content has been generated, or information about the numbers of times the edge data network has been requested for content.

16. The edge data network of claim 15, wherein the processor is further configured to execute the plurality of instructions to:

request the web server to send the first content, receive the first content from the web server, and store the first content.

17. The edge data network of claim 16, wherein the processor is further configured to execute the plurality of instructions to, when caching the first content:

transcode the first content, and store the transcoded first content.

18. The edge data network of claim 10, wherein the processor is further configured to execute the plurality of instructions to identify the first content cached by the edge data network from among the plurality of pieces of content for displaying the web page, based on the URLs of the plurality of pieces of content for displaying the web page and information about a plurality of pieces of content cached by the edge data network.

* * * * *